__United States Patent__ [19]

Kerko et al.

[11] Patent Number: 4,550,087

[45] Date of Patent: Oct. 29, 1985

[54] PHOTOCHROMIC COMFORT GLASSES

[75] Inventors: David J. Kerko; David W. Morgan, both of Corning; Richard W. Thompson, Big Flats, all of N.Y.

[73] Assignee: Corning Glass Works, Corning, N.Y.

[21] Appl. No.: 650,194

[22] Filed: Sep. 13, 1984

[51] Int. Cl.[4] .................... C03C 3/26; C03C 3/08
[52] U.S. Cl. ........................................ 501/13; 501/66; 501/56; 501/77; 501/67
[58] Field of Search .............. 501/13, 67, 66, 65, 501/56, 77

[56] References Cited

U.S. PATENT DOCUMENTS

| | | | |
|---|---|---|---|
| 3,208,860 | 7/1962 | Armistead et al. | 501/13 |
| 4,018,965 | 4/1977 | Kerko et al. | 501/13 |
| 4,102,693 | 7/1978 | Owen et al. | 501/13 |
| 4,190,451 | 2/1980 | Hares et al. | 501/13 |
| 4,407,966 | 10/1983 | Kerko et al. | 501/13 |
| 4,485,178 | 11/1984 | Gliemeroth et al. | 501/13 |
| 4,486,541 | 12/1984 | Gliemeroth et al. | 501/13 |

Primary Examiner—William R. Dixon, Jr.
Assistant Examiner—Ann M. Knab
Attorney, Agent, or Firm—C. S. Janes, Jr.

[57] ABSTRACT

This invention is directed to the preparation of haze-free photochromic glasses which darken to a comfort range, i.e., a luminous transmittance of about 40–60%, which exhibit very rapid fading, and which demonstrate excellent temperature dependence. The glasses consist essentially, in weight percent with the levels of Ag, $Cu_2O$, Cl, and Br representing values as analyzed in the glass, of:

| | | | |
|---|---|---|---|
| $Li_2O$ | 0–2.5 | $P_2O_5$ | 0–25 |
| $Na_2O$ | 0–9 | $SiO_2$ | 20–65 |
| $K_2O$ | 0–17 | Ag | 0.115–0.145 |
| $Cs_2O$ | 0–6 | Br | 0.11–0.155 |
| $Li_2O + Na_2O + K_2O + Cs_2O$ | 8–20 | | |
| $B_2O_3$ | 14–23 | $Cu_2O$ | 0.007–0.011 |
| $Al_2O_3$ | 5–25 | Cl | 0.1–0.15 | and wherein the molar ratio alkali metal oxide: $B_2O_3$ ranges between about 0.55–0.85, the weight ratio Ag:(Cl+Br) ranges between about 0.65–0.95, and the sum of Ag+Br is at least 0.26%, when the Br content is 0.11%, and at least 0.25% when the Ag content is 0.115%.

3 Claims, No Drawings

PHOTOCHROMIC COMFORT GLASSES

BACKGROUND OF THE INVENTION

The initial development of photochromic glasses, or phototropic glasses as such have been variously termed, was disclosed in U.S. Pat. No. 3,208,860. The first photochromic glass to enjoy substantial commercial success was utilized in prescription ophthalmic lenses marketed under the trademark PHOTOGRAY ®. That glass was encompassed within the disclosure of U.S. Pat. No. 3,208,860 and had the approximate analysis recorded below in weight percent:

| | | | |
|---|---|---|---|
| $SiO_2$ | 55.6 | PbO | 5.0 |
| $B_2O_3$ | 16.4 | $ZrO_2$ | 2.2 |
| $Al_2O_3$ | 8.9 | Ag | 0.16 |
| $Li_2O$ | 2.65 | CuO | 0.035 |
| $Na_2O$ | 1.85 | Cl | 0.24 |
| $K_2O$ | 0.01 | Br | 0.145 |
| BaO | 6.7 | F | 0.19 |
| CaO | 0.2 | | |

Photochromic performance, i.e., the degree of darkening and rate of fading exhibited by a glass, has always been of prime significance in adjudging the utility thereof. Whereas it was recognized that photochromic glasses were activated by radiations in the ultraviolet and low visible portions of the spectrum, laboratory experience indicated that frequently the correlation between data obtained upon exposure to an ultraviolet lamp and data obtained upon exposure to sunlight was quite poor. Consequently, in order to achieve better correlation between indoor laboratory testing and outdoor exposure to sunlight, the solar simulator apparatus described in U.S. Pat. No. 4,125,775 was designed. That apparatus emits radiation which closely approximates the spectral output of the solar spectrum.

The extensive research which has been expended in the development of photochromic glasses has revealed that the dynamics of photochromic behavior are dependent to a greater or lesser extent upon the ambient temperature. Accordingly, where other factors are held constant, a photochromic glass will generally darken to a lower transmission when exposed to actinic radiation at a low temperature, e.g., 0° C. (32° F.), than at a temperature of, say 40° C. (104° F.). Furthermore, photochromic glasses typically fade more slowly at low temperatures when the actinic radiation is removed than at higher temperatures. This variance in behavior has been defined as the "temperature dependence" of a glass. As can be appreciated, except for an unusual application, the lower the temperature dependence exhibited by a glass, the better suited it will be for general utility.

The initial research in ophthalmic photochromic lenses, exemplified by the above-described PHOTOGRAY ® lenses, produced glasses which darkened only to the "comfort range", i.e., to luminous transmittances in the vicinity of about 40-60%, when subjected to actinic radiation, and faded quite slowly when removed from the actinic radiation. Consumer demand, however, fostered further research to develop glasses which could function as sunglasses outdoors, i.e., darken to luminous transmittances below 40% and desirably considerably less, and which would fade rapidly when worn indoors. That demand resulted in the production of prescription lenses marketed under the trademark PHOTOGRAY EXTRA ® which darken to a considerably lower luminous transmittance and fade much more rapidly than PHOTOGRAY ® lenses. The glass for PHOTOGRAY EXTRA lenses is included within the composition ranges described in U.S. Pat. No. 4,190,451. That patent discloses glasses which, in 2 mm cross section, exhibit the following photochromic characteristics:

(a) at about 20° C. the glasses will darken to a luminous transmittance below 40% in the presence of actinic radiation; will fade at least 30 percentage units of transmittance after five minutes' removal from the actinic radiation; and will facde to a luminous transmittance greater than 80% within two hours after being removed from the actinic radiation;

(b) at about 40° C. the glasses will darken to a luminous transmittance below 55% in the presence of actinic radiation; will fade at least 25 percentage units of transmittance after five minutes' removal from the actinic radiation; and will fade to a luminous transmittance in excess of 80% within two hours after being removed from the actinic radiation; and (c) at about −18° C. the glasses will not darken to a luminous transmittance below 15% in the presence of actinic radiation.

The glasses of U.S. Pat. No. 4,190,451 consist essentially, expressed in terms of weight percent on the oxide basis, of:

| | | | |
|---|---|---|---|
| $Li_2O$ | 0–2.5 | $P_2O_5$ | 0–25 |
| $Na_2O$ | 0–9 | $SiO_2$ | 20–65 |
| $K_2O$ | 0–17 | CuO | 0.004–0.02 |
| $Cs_2O$ | 0–6 | Ag | 0.15–0.3 |
| $Li_2O + Na_2O + K_2O + Cs_2O$ | 8–20 | Cl | 0.1–0.25 |
| $B_2O_3$ | 14–23 | Br | 0.1–0.2 |
| $Al_2O_3$ | 5–25 | | |
| molar ratio alkali metal oxide: $B_2O_3$ | | 0.55–0.85 | |
| weight ratio Ag: (Cl + Br) | | 0.65–0.95 | |

Another evidence of research to develop glasses demonstrating improved photochromic performance is found in U.S. Pat. No. 4,102,693. Those glasses are stated to have a half fading time of not more than 60 seconds and contain silver halide crystals to provide photochromism. The base glass compositions are free from BaO and consist essentially, in weight percent, of:

| | | | |
|---|---|---|---|
| $SiO_2$ | 31–59 | $P_2O_5$ | 0–12 |
| $B_2O_3$ | 18–28 | $ZrO_2$ | 0–7 |
| $Al_2O_3$ | 8–20 | $TiO_2$ | 0–5 |
| $Li_2O$ | 0–3 | PbO | 0–7 |
| $Na_2O$ | 0–8 | $Ag_2O$ | 0.05–4 |
| $K_2O$ | 0–16 | F | 0–0.2 |
| $Li_2O + Na_2O + K_2O$ | 6–16 | Cl | 0.04–0.5 |
| MgO | 0–2.6 | Br | 0–1 |
| CuO | 0–1 | F + Cl + Br | 0.13–1 |

A more recent advance in providing photochromic glasses exhibiting very fast fading capabilities, coupled with a high degree of darkening, is described in U.S. Pat. No. 4,407,966. The glasses disclosed therein are asserted to darken to a luminous transmittance below 35% at a temperature of 40° C. and will fade at least 40 percentage units of transmittance after five minutes' removal from the actinic radiation; will darken to a luminous transmittance below 25% at a temperature of 25° C. and will fade at least 35 percentage units of transmittance after five minutes' removal from the actinic radiation; and will retain a darkened luminous transmittance greater than 15% at 0° C. The glasses consist essentially, in weight percent, of:

| SiO$_2$ | 56–70 | PbO | 0.1–0.15 |
|---|---|---|---|
| Al$_2$O$_3$ | 6–9 | Ag | >0.15–0.25 |
| B$_2$O$_3$ | 18–21 | Cl | 0.2–0.35 |
| Li$_2$O | >2.5–3.5 | Br | 0.075–0.15 |
| Na$_2$O | 0.5–2.5 | CuO | 0.004–0.02 |
| K$_2$O | 5–7 | CeO$_2$ | 0–0.5 |
| ZrO$_2$ | 3.75–5 | | |

Whereas the principal thrust of the research with respect to photochromic glass has been directed toward developing compositions which would darken to low luminous transmittance values, i.e., compositions suitable for use as sunglasses, and fade ever more rapidly, there has been a continuing demand for glasses which would darken only to the "comfort range", but which would fade much more rapidly than the PHOTOGRAY ® lenses described above. Hence, as is illustrated in U.S. Pat. No. 4,190,451, PHOTOGRAY ® lenses darken to a luminous transmittance of 53.5% at 40° C. and fade 23 percentage units of transmittance after five minutes' removal from the actinic radiation; and darken to a luminous transmittance of 37.5% at 0° C. and fade 10 percentage units of transmittance after five minutes' removal from the actinic radiation.

Market research data had disclosed a desire for photochromic ophthalmic lenses which would exhibit good temperature dependence over the ambient temperature range of about 0°–40° C. (32°–104° F.) and would darken to a luminous transmittance between about 40–60%, preferably about 45–50%, within that ambient temperature range. As defined herein, good temperature dependence signifies a difference in darkened luminous transmittance of less than 15 percentage units of transmittance, preferably less than 10, over the range of 0°–40° C. The data also indicated that the lenses should fade at least 30 percentage units of transmittance after five minutes' removal from the actinic radiation.

In view of previous experience, it was recognized that the rate of fading at cooler temperatures becomes quite slow. That phenomenon, however, has not been adjudged to be of substantial practical significance because, more often than not, the circumstances will be such that the glass is warming up while it is fading. For example, the wearer of the eyeglasses will be coming indoors from being outdoors on a cold day such that the rise in temperature contacting the lenses will increase their fade rate.

Accordingly, the following criteria for the inventive glasses were devised:

(1) in a thickness of about 2 mm the glasses will demonstrate the following photochromic properties:
  (a) over the range of about 0°–40° C. the glasses will darken to a luminous transmittance in the presence of actinic radiation, e.g., outdoor sunlight, of between about 40–60%, preferably about 45–50%;
  (b) over the range of about 0°–40° C. the difference in darkened luminous transmittance exhibited by the glasses will be less than 15 percentage units of transmittance, preferably less than 10; and
  (c) over the range of about 25°–40° C. the glasses will fade at least 30 percentage units of transmittance after five minutes' removal from the actinic radiation;

(2) the glasses are capable of being strengthened through thermal tempering or chemical strengthening while essentially retaining the desired photochromic properties; and (3) the glasses have compositions suitable for refractive index adjustment without substantial loss of the desired photochromic properties.

As employed herein, the luminous transmittance of a glass is defined as the value Y delineated in terms of the 1931 C.I.E. trichromatic colorimetric system utilizing the light source Illuminant C. This colorimetric system and light source are described by A. C. Hardy in the *Handbook of Colorimetry*, Technology Press, M.I.T., Cambridge, Mass. (1936).

SUMMARY OF THE INVENTION

We have found that the above-cited criteria can be secured in glasses having the base compositions disclosed in U.S. Pat. No. 4,190,451 but wherein the "photochromic elements", i.e., Ag, Cu$_2$O, Cl, and Br, are held within extremely restricted limits. Accordingly, the base glass compositions operable in the present invention consist essentially, expressed in terms of weight percent on the oxide basis, of:

| Li$_2$O | 0–2.5 | B$_2$O$_3$ | 14–23 |
|---|---|---|---|
| Na$_2$O | 0–9 | Al$_2$O$_3$ | 5–25 |
| K$_2$O | 0–17 | P$_2$O$_5$ | 0–25 |
| Cs$_2$O | 0–6 | SiO$_2$ | 20–65 |
| Li$_2$O + Na$_2$O + K$_2$O + Cs$_2$O | 8–20 | | | and included therein as analyzed in weight percent

| Ag | 0.115–0.145 | Cu$_2$O | 0.007–0.011 |
|---|---|---|---|
| Br | 0.11–0.155 | Cl | 0.1–0.15 | and wherein the molar ratio alkali metal oxide:B$_2$O$_3$ ranges between about 0.55–0.85, the weight ratio Ag:(Cl+Br) ranges between about 0.65–0.95, and the sum of Ag+Br is at least 0.26%, when the Br content is 0.11%, and at least 0.25% when the Ag content is 0.115%.

In like manner to the disclosure in U.S. Pat. No. 4,190,451, to said base compositions may be added up to 10% by weight total of the following extraneous components in the indicated proportions of up to 6% ZrO$_2$, up to 3% TiO$_2$, up to 0.5% PbO, up to 7% BaO, up to 4% CaO, up to 3% MgO, up to 6% Nb$_2$O$_5$, up to 4% La$_2$O$_3$, and up to 2% F; and up to 1% total of transition metal oxides and/or up to 5% total of rare earth metal oxides as colorants. Also, up to 0.25% As$_2$O$_3$ and/or Sb$_2$O$_3$ may advantageously be included in the 10% of extraneous components.

The mechanism underlying the darkening to the comfort range only involves the carefully regulated generation of silver halide crystals. Thus, the number of crystals developed must be limited such that the darkening effect caused thereby does not lend to luminous transmittance below the comfort range, and the size of the crystals must be so controlled as to not exceed about 300 Å. Crystals having dimensions greater than about 300 Å cause scattering of light which is observed in the glass as haze. Hence, haze is the result of insufficient nucleation which, in turn, leads to fewer, but larger, silver halide crystals.

We have found that the combined level of Ag and Br is of critical importance in inhibiting the development of haze in the glass. Br appears to exert a greater effect in this regard than Ag. Thus, to insure adequate nucleation in order to inhibit the development of haze, the combined contents of those two components must total at least 0.26%, when Br is in the low region of operable content, and at least 0.25% when Ag is in the low region of operable content. The practical effect of that circumstance is that the expensive Ag content can be held at a low level with the Br utilized at a relatively high level.

DESCRIPTION OF PREFERRED EMBODIMENTS

Corning Code 8111 glass, marketed by Corning Glass Works, Corning, N.Y. under the trademark PHOTOGRAY EXTRA®, is encompassed within U.S. Pat. No. 4,190,451 and consists essentially, expressed in parts by weight on the oxide basis (the Ag, $Cu_2O$, Cl, and Br reflecting analyzed values in weight percent) of:

| | | | |
|---|---|---|---|
| $SiO_2$ | 56.2 | $TiO_2$ | 2.3 |
| $B_2O_3$ | 18.2 | $ZrO_2$ | 5.0 |
| $Al_2O_3$ | 6.2 | Ag | 0.20 |
| $Li_2O$ | 1.8 | $Cu_2O$ | 0.008 |
| $Na_2O$ | 4.1 | Cl | 0.22 |
| $K_2O$ | 5.7 | Br | 0.16 |

Lens blanks which had been pressed from a commercial run of the glass and subjected to the commercial heat treatment of ~30 minutes at ~655° C. to develop photochromism therein, were ground and polished to a thickness of about 2 mm and then chemically strengthened employing the commercial practice of immersion for 16 hours into a bath of molten salt consisting, by weight, of 60% $KNO_3$ and 40% $NaNO_3$ operating at 400° C. After removal from the bath, the samples were rinsed with water to eliminate adhering salt and measurements of photochromism undertaken utilizing the solar simulator.

Table I records the temperatures to which the specimens were exposed, $T_o$ indicates the initial luminous transmittance prior to exposure to the solar simulator, $T_{D15}$ reflects the luminous transmittance of the samples after a 15 minute exposure to the solar simulator, and $P_{F5}$ represents the points of transmittance faded by the specimens five minutes after their withdrawal from the solar simulator.

TABLE I

| Exposure Temperature | $T_o$ | $T_{D15}$ | $P_{F5}$ |
|---|---|---|---|
| 40° C. | 89.7 | 40.9 | 39.3 |
| 25° C. | 89.2 | 27.5 | 41.4 |
| 0° C. | 89.4 | 21.6 | 10.7 |

As is evident from Table I, the samples darkened considerably below the comfort range.

To illustrate the criticality of composition control with respect to the "photochromic elements", the series of glasses reported in Table II in terms of parts by weight on the oxide basis was prepared wherein the base composition of Corning Code 8111 glass was used, but wherein the levels of Ag, $Cu_2O$, Cl, and Br were varied. Because the sum of the individual components of the base composition closely approximates 100, for all practical purposes each tabulated value may be deemed to reflect weight percent. The Ag, $Cu_2O$, Cl, and Br levels reflect values in weight percent as analyzed by x-ray fluorescence.

The batch materials were compounded, ballmilled together to assist in achieving a homogeneous melt, and then charged into a laboratory scale, continuous melting unit operating at about 1450° C. Lens blanks were pressed therefrom and immediately transferred to a lehr operating at 480° C.

The annealed blanks were thereafter subjected to the same heat treatment as recited above for Corning Code 8111 in order to generate photochromism therein, and subsequently ground and polished to a thickness of about 2 mm. Photochromic performance was measured on Examples 1–5 employing the solar simulator.

TABLE II

| | 1 | 2 | 3 | 4 | 5 |
|---|---|---|---|---|---|
| $SiO_2$ | 56.2 | 56.2 | 56.2 | 56.2 | 56.2 |
| $B_2O_3$ | 18.2 | 18.2 | 18.2 | 18.2 | 18.2 |
| $Al_2O_3$ | 6.2 | 6.2 | 6.2 | 6.2 | 6.2 |
| $Li_2O$ | 1.8 | 1.8 | 1.8 | 1.8 | 1.8 |
| $Na_2O$ | 4.1 | 4.1 | 4.1 | 4.1 | 4.1 |
| $K_2O$ | 5.7 | 5.7 | 5.7 | 5.7 | 5.7 |
| $TiO_2$ | 2.3 | 2.3 | 2.3 | 2.3 | 2.3 |
| $ZrO_2$ | 5.0 | 5.0 | 5.0 | 5.0 | 5.0 |
| Ag | 0.108 | 0.22 | 0.119 | 0.142 | 0.132 |
| $Cu_2O$ | 0.007 | 0.013 | 0.007 | 0.006 | 0.007 |
| Cl | 0.224 | 0.23 | 0.103 | 0.122 | 0.107 |
| Br | 0.135 | 0.14 | 0.163 | 0.113 | 0.124 |

Table III records the temperatures to which the specimens were exposed, $T_o$ indicates the initial luminous transmittance prior to exposure to the solar simulator, $T_{D15}$ reflects the luminous transmittance of the samples after a 15 minute exposure to the solar simulator, and $P_{F5}$ designates the points of transmittance faded by the specimens five minutes after their withdrawal from the solar simulator. Example 5A comprises a sample of Example 5 but which had been chemically strengthened in the commercial manner through immersion for 16 hours in a bath of molten 60% by weight $KNO_3$, 40% by weight $NaNO_3$ operating at 400° C. prior to measuring photochromic performance. Table III also reports a qualitative measure of haze and a calculation of the temperature dependence, i.e., the difference in darkened transmittance between 40° C. and 0° C. (Δ40°-0° C.).

TABLE III

| Example | Temperature | $T_o$ | $T_{D15}$ | $P_{F5}$ | Haze | Δ40°-0° C. |
|---|---|---|---|---|---|---|
| 1 | 0° C. | 88.0 | 30.4 | 23.8 | Yes | |
| 1 | 25° C. | 87.7 | 50.5 | 25.2 | Yes | |
| 1 | 40° C. | 88.0 | 63.0 | 19.0 | Yes | 32.6 |
| 2 | 0° C. | 90.5 | 22.8 | 31.5 | No | |
| 2 | 25° C. | 90.5 | 52.5 | 27.0 | No | |
| 2 | 40° C. | 90.6 | 66.1 | 20.2 | No | 43.3 |
| 3 | 0° C. | 89.8 | 44.8 | 29.5 | No | |
| 3 | 25° C. | 89.7 | 63.2 | 22.3 | No | |
| 3 | 40° C. | 89.9 | 73.7 | 14.9 | No | 28.9 |
| 4 | 0° C. | 89.3 | 42.3 | 9.1 | Slight | |
| 4 | 25° C. | 89.4 | 45.4 | 32.1 | Slight | |
| 4 | 40° C. | 89.6 | 47.4 | 35.3 | Slight | 5.1 |
| 5 | 0° C. | 91.0 | 42.4 | 11.0 | No | |
| 5 | 25° C. | 90.5 | 42.2 | 35.1 | No | |
| 5 | 40° C. | 91.5 | 52.2 | 33.0 | No | 9.8 |
| 5A | 0° C. | 88.8 | 40.7 | 12.2 | No | |
| 5A | 25° C. | 89.1 | 43.0 | 36.0 | No | |
| 5A | 40° C. | 90.2 | 52.1 | 32.3 | No | 11.4 |

A study of Table II and III provides the following data:

(1) the low silver level in Example 1 yields a glass which is visibly hazy and wherein the temperature dependence is quite excessive;

(2) the high $Cu_2O$ and high Ag levels in Example 2 produce a glass of excessive temperature dependence;

(3) the high Br content Example 3 does not darken sufficiently and temperature dependence is excessive;

(4) the sum of Ag+Br in Example 4 is too low to provide sufficient nucleation to inhibit the formation of haze because the Br level is in the low region of operable content;

(5) Example 5 is our preferred glass; darkening is to the comfort range; temperature dependence is good; the glasses fade rapidly; the level of haze is minimal; and the measurements of photochromic performance of Example 5A indicate that Example 5 can be chemically strengthened without deteriorating the photochromic behavior appreciably.

We claim:

1. An essentially haze-free photochromic glass which, in a thickness of about 2 mm, will exhibit the following photochromic properties when measured by solar simulator:

(a) over the range of about 0°–40° C. will darken to a luminous transmittance in the presence of actinic radiation of between about 40–60%;

(b) over the range of about 0°–40° C. the difference in darkened luminous transmittance will be less than 15 percentage units of transmittance; and (c) over the range of about 25°–40° C. will fade at least 30 percentage units of transmittance after five minutes' removal from the actinic radiation;

said glass having a composition suitable for refractive index adjustment and capable of being chemically strengthened without substantial loss of photochromic properties consisting essentially, expressed in terms of weight percent on the oxide basis, with the levels of Ag, $Cu_2O$, Cl, and Br representing values as analyzed in the glass, of:

| | | | |
|---|---|---|---|
| $Li_2O$ | 0–2.5 | $P_2O_5$ | 0–25 |
| $Na_2O$ | 0–9 | $SiO_2$ | 20–65 |
| $K_2O$ | 0–17 | Ag | 0.115–0.145 |
| $Cs_2O$ | 0–6 | Br | 0.11–0.155 |
| $Li_2O + Na_2O + K_2O + Cs_2O$ | 8–20 | | |
| $B_2O_3$ | 14–23 | $Cu_2O$ | 0.007–0.011 |
| $Al_2O_3$ | 5–25 | Cl | 0.1–0.15 | and wherein the molar ratio alkali metal oxide:$B_2O_3$ ranges between about 0.55–0.85, the weight ratio Ag:(Cl+Br) ranges between about 0.65–0.95, and the sum of Ag+Br is at least 0.26%, when the Br content is 0.11%, and at least 0.25% when the Ag content is 0.115%.

2. A photochromic glass according to claim 1 wherein to said composition are added up to 10% by weight total of the following extraneous components in the indicated proportions of up to 6% $ZrO_2$, up to 3% $TiO_2$, up to 0.5% PbO, up to 7% BaO, up to 4% CaO, up to 3% MgO, up to 6% $Nb_2O_5$, up to 4% $La_2O_3$, up to 0.25% $As_2O_3$ and/or $Sb_2O_3$, and up to 2% F; and up to 1% total of transition metal oxides and up to 5% total of rare earth metal oxides as colorants.

3. A photochromic glass according to claim 2 having the following approximate composition:

| | | | |
|---|---|---|---|
| $SiO_2$ | 56.2 | $TiO_2$ | 2.3 |
| $B_2O_3$ | 18.2 | $ZrO_2$ | 5.0 |
| $Al_2O_3$ | 6.2 | Ag | 0.132 |
| $Li_2O$ | 1.8 | $Cu_2O$ | 0.007 |
| $Na_2O$ | 4.1 | Cl | 0.107 |
| $K_2O$ | 5.7 | Br | 0.124. |

* * * * *